(No Model.) 6 Sheets—Sheet 1.

J. R. MONTAGUE & J. A. PROSS.
ROLLER COTTON GIN.

No. 485,015. Patented Oct. 25, 1892.

WITNESSES:
B. W. Meller
Baltus De Long

INVENTORS
JOHN R. MONTAGUE
JOHN A PROSS
BY
Baldwin Davidson & Wight
ATTORNEYS (No Model.) 3 Sheets—Sheet 2.

J. R. MONTAGUE & J. A. PROSS.
ROLLER COTTON GIN.

No. 485,015. Patented Oct. 25, 1892.

WITNESSES:
B. W. Miller
Baltus D. Long

INVENTORS
JOHN R. MONTAGUE
JOHN A. PROSS
BY
Baldwin Davidson & Wight
ATTORNEYS (No Model.) 6 Sheets—Sheet 4.

J. R. MONTAGUE & J. A. PROSS.
ROLLER COTTON GIN.

No. 485,015. Patented Oct. 25, 1892.

WITNESSES:
B. W. Miller
Baltus DeLong

INVENTORS
JOHN R. MONTAGUE
JOHN A PROSS
BY
Baldwin Davidson & Wright
ATTORNEYS (No Model.) 6 Sheets—Sheet 5.

J. R. MONTAGUE & J. A. PROSS.
ROLLER COTTON GIN.

No. 485,015. Patented Oct. 25, 1892.

Fig. 5a

Fig. 5
ON LINE 5-5

WITNESSES:
B. W. Miller
Baltus DeLong

INVENTORS
JOHN R. MONTAGUE
JOHN A. PROSS
BY
Baldwin Davidson & Wight
ATTORNEYS

(No Model.) 6 Sheets—Sheet 6.

J. R. MONTAGUE & J. A. PROSS.
ROLLER COTTON GIN.

No. 485,015. Patented Oct. 25, 1892.

WITNESSES:
B. W. Miller
Baltus De Long

INVENTORS
JOHN R. MONTAGUE
JOHN A PROSS
BY
Baldwin Davidson & Wight
ATTORNEYS

UNITED STATES PATENT OFFICE.

JOHN RICHARD MONTAGUE AND JOHN ADAM PROSS, OF SYRACUSE, NEW YORK.

ROLLER COTTON-GIN.

SPECIFICATION forming part of Letters Patent No. 485,015, dated October 25, 1892.

Application filed November 2, 1891. Serial No. 410,641. (No model.)

*To all whom it may concern:*

Be it known that we, JOHN RICHARD MONTAGUE and JOHN ADAM PROSS, both citizens of the United States, residing at Syracuse, in the county of Onondaga and State of New York, have invented certain new and useful Improvements in Roller Cotton-Gins, of which the following is a specification.

Our invention more especially relates to roller cotton-gins of that class adapted to open or spread out the bolls, to remove impurities therefrom, to deliver the cotton to the ginning-rolls in regulated quantities and in good condition for that operation, effectually to separate the lint-cotton from the seed, to keep the rolls clear, and to remove all impurities practicable from the lint during this process. Exemplifications of this apparatus may be found in the following Letters Patent heretofore granted to John R. Montague, viz: No. 383,754, of May 29, 1888, No. 400,002, of March 19, 1889, and No. 462,722, of November 10, 1891.

The object of our invention is to separate lint-cotton from its seed as well as from impurities simply and effectually in good condition for further treatment. This end we attain by certain novel combinations, organizations, and constructions of instrumentalities herein described, and specified in the claims.

In order to carry out our invention in the best way now known to us, we provide a hopper for the seed-cotton, having an opening in its bottom traversed by a slowly-moving feed-apron or carrier-belt, over which a roller provided with several rows of spikes or teeth revolves in a direction opposite to that of the travel of the adjacent surface of the feed-belt in order to feed a definite amount of seed-cotton to the machine in a given time. An adjustable gate in front of this roller regulates this feed. The carrier-belt is adjustable toward or from the feed-rolls to vary the distance between them, which should always be such as to allow stones, immature cotton-bolls, shells or shucks of bolls, and other foreign matters to pass between them and the lifting-roller and drop out of the machine. A spiked lifting-roller turns near the inner end of the carrier-belt in the same direction as the feed-roller and serves not only to catch such seed-cotton as might pass under the feed-roller, but also that which drops from the latter and throws it over into a second hopper provided with an open bottom, in which two parallel rollers, preferably with smooth elastic surfaces, revolve outward or downward on their adjacent sides, so as to feed a regulated quantity of the seed-cotton upon a beater-cylinder revolving rapidly in a chamber partly inclosed by a screen, through which dust, sand, leaves, &c., may be blown. From this chamber the lint-cotton passes through a tunnel terminating in a chute, which conducts it to the ginning-rolls. A screen constituting a portion of the tunnel-wall at its intersection with the chute not only serves for the escape of dust, &c., but by allowing the air to escape at that point also prevents the formation of currents and eddies and allows the seed-cotton to drop upon the rolls in good condition. The upper one of these ginning-rolls is of comparatively-large diameter—say about five inches—of tolerably-elastic material—such as rubber packing—wound spirally thereon in strips about a half-inch square in cross-section. The other ginning-roll is of much smaller diameter—say about nine-sixteenths of an inch—with its surface spirally grooved or fluted, so as to resemble a screw of long pitch. This roll should be supported by suitable bearings at short distances apart—say about eight inches—to prevent it from yielding laterally or springing away from the larger roll. These bearings preferably consist of friction rollers or balls adapted to turn freely about the shaft and in their bearings in well-known ways. This organization enables us to run this roller at very high speed— say thirty-five hundred revolutions per minute—at a very small expenditure of power. The friction with the larger roll would generally be sufficient for this purpose; but to prevent its slipping or stopping we prefer to drive it positively by a belt or gearing. We find that this rapidly-running spirally-grooved roller quickly and effectively strips the lint from the seed. To prevent the latter from being carried between the rolls with the lint, we interpose between these rolls a guard-plate lying close to and conforming to the curvature of the large ginning-roll. A series of perforations in this guard-plate enables the seed-cotton to come in contact with the larger feed-roll, but not to pass through the holes in the plate, the roll being so close to them. This roll draws the lint and seed down toward the small spirally-grooved roll, which, revolving rapidly in the opposite direction, seizes the lint and draws it away from the seed by wrenching it therefrom sidewise. As the lint escapes from between the ginning-rolls it is acted upon by a clearer-roll, the surface of which is covered with longitudinal rows of ribs or wings of elastic material—such as thin rubber packing—which revolves in contact with the surfaces of both rolls and effectually removes any adhering lint therefrom. An adjustable inclined plate or chute-board sliding over these wings allows more or less of them to act upon the seed-cotton, as occasion requires. A carrying-roller turning in the bottom of the chute near the ginning-rolls assists in feeding the seed-cotton to them, and an adjustable gate or grating consisting of parallel wires in the bottom of the chute regulates the width of the discharge-opening, through which grating some of the delinted seed fall, the remainder passing down between the carrying-roller and an inclined chute-board into a suitable receptacle. A rapidly-revolving brush-wheel not only cleans the larger ginning-roll and winged clearer-roll, but creates an air-blast, which drives the lint through a hood upon a revolving wire-cloth drum or screen, which delivers it into a suitable receptacle. The escaping air passing through the drum also drives the lint from its surface into this receptacle, and thus prevents its clogging.

The accompanying drawings show so much only of the apparatus embodying all the improvements herein claimed as is necessary to illustrate the subject-matter. Some of these improvements may, however, be used without the others and in machines the details of which differ within certain limits from those herein claimed.

The feed end of the machine we term the "front" and the ginning end the "rear." That portion of the machine on the right of a person in front of and facing the machine we term the "right side," and the opposite the "left." Arrows indicate the direction of movement of some of the parts. Unless otherwise indicated, the parts are of usual approved construction.

Figure 1 is a plan with portions broken away to show the parts beneath; Fig. 1$^a$, a detailed plan of the feed-roller-driving gear; Fig. 2$^a$, a detailed view of the larger or smooth ginning-roll; Fig. 4, a similar view of the left side; Fig. 4$^a$, a detailed view showing our way of driving the brush-wheel, clearer-roll, small ginning-roll, &c.; Fig. 5, a vertical longitudinal central section on the line 5 5, looking to the right; Fig. 5$^a$, a similar view, on an enlarged scale, of the ginning-rolls and pertinent parts; Fig. 6, a similar view of the same and some additional parts. Fig. 8, a rear elevation of the ginning-rolls, guard-plate, &c., on an enlarged scale; Fig. 9, a similar detailed view of the spirally-grooved ginning-roll; Fig. 9$^a$, a cross-section therethrough; Fig. 10, an elevation of a portion of the guard-plate or seed-retaining plate on an enlarged scale, and Fig. 10$^a$ an edge view thereof.

Figures 4, 4A:
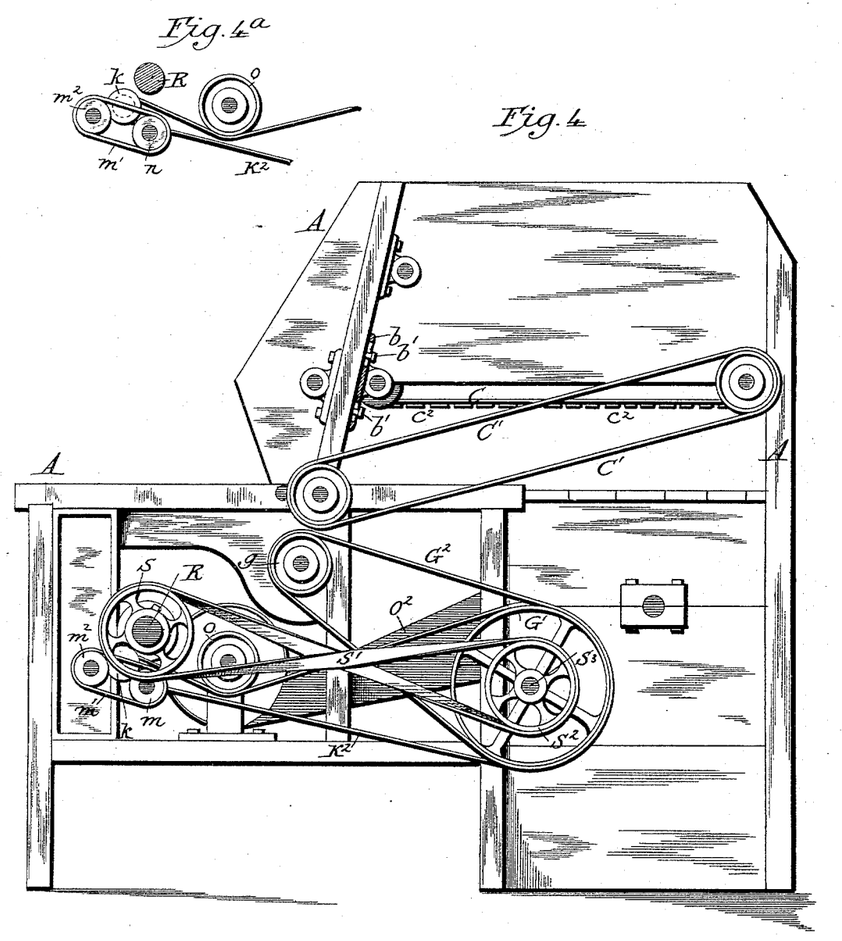

The mechanism is shown as mounted in a main frame A. The seed-cotton is placed in a hopper or receptacle B, having an open bottom traversed slowly from front to rear by an endless apron or carrier-belt C, encircling rollers $c\ c'$. The carrier preferably consists of belts connected by parallel cross-bars $c^2$, with spaces between, through which spaces impurities may fall. Either or both ends of the carrier-belt may be adjusted vertically relatively to the hopper, over the rear end of which a feed roll or cylinder D revolves, its lower section moving in the opposite direction to the feed-belt. The drawings, Fig. 4, show the rear bearings of the roller $c'$ as mounted in vertically-slotted plates $b$, held in the desired position by set-screws $b'$ in a well-known way. The cylinder D is armed at intervals with transverse rows of spikes or teeth $d$, two such rows being shown in the drawings, and revolves rapidly enough to enable its teeth to pick up the required quantity of seed-cotton, carry it over the cylinder, and drop it on a smaller similarly-spiked lifting-roller E, rotating in the same direction with the cylinder near the rear end of the carrier-belt and at about the same level in a hopper E'. The quantity of cotton carried over by the feed-cylinder D is regulated by an adjustable flap or gate D', hung over the carrier-belt in front of the cylinder. (See Fig. 5.) This lifting-roller acts not only upon the seed-cotton deposited upon it by the feed-cylinder, but upon any that may pass between that cylinder and the carrier-belt, the space between them being always sufficient to allow stones, immature cotton-bolls, and other foreign matters to pass between them and drop out of the machine through an opening $e$. The seed-cotton thus deposited in the second hopper E' is fed downward in regulated quantities between small rubber rolls F F', revolving close together in its open bottom upon a transversely-ribbed beater-cylinder G, revolving rapidly in a chamber H, the lower portion of which conforms to the contour of the cylinder, and the upper surface of which revolves from rear to front, so as to carry the seed-cotton entirely around it before discharging it through its tunnel I. The front and lower portion of the beater-chamber is composed of a perforated screen H', through which dust, sand, leaves, &c., may be blown out of the machine. This screen is preferably composed of parallel horizontal rods $h$, about three-sixteenths of an inch in diameter and as long as the machine is wide, held in place by winding smaller wires around them at intervals in vertical parallel rows. The beater discharges the seed-cotton through the tunnel I, which is shown as substantially horizontal, into a descending chute J, which conducts it to the ginning-rolls. A screen $i$, constituting a portion of the tunnel-wall where it intersects the chute, permits the escape of dust, &c., and also prevents the formation of cross-currents or eddies at that point, and thus permits the seed-cotton to pass to the ginning-rolls in good condition.

Figures 8, 9, 9A, 10, 10A:
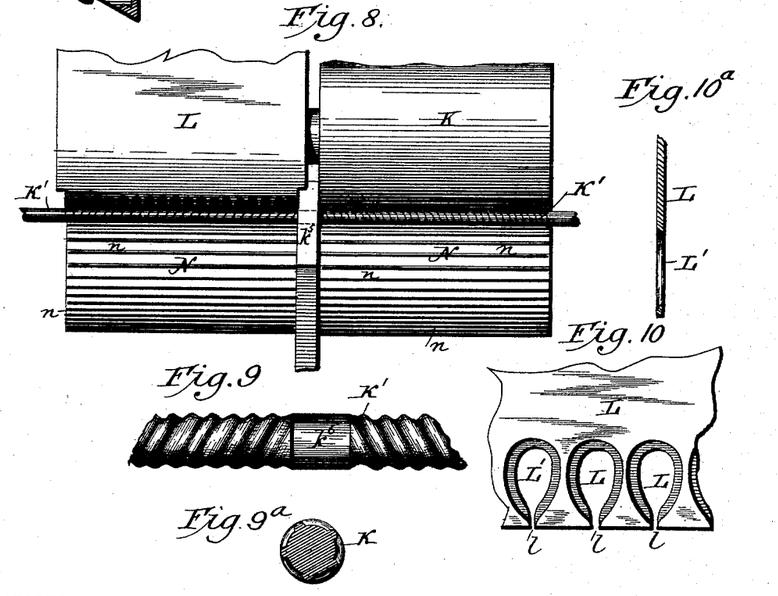

The ginning-rolls are shown as arranged with their rear surfaces in line with the front wall of the chute near its open bottom. The upper ginning-roll K is of comparatively-large diameter—say about five inches—with a smooth surface composed of elastic material—such as rubber packing—wound spirally thereon in strips about half an inch square in cross-section and secured in well-known ways. The other or lower ginning-roll K′ is of much smaller diameter—say about nine-sixteenths of an inch—of metal, with its surface spirally grooved or fluted, so as to resemble a screw. (See Figs. 9 and 9ª.) This roll revolves in the same direction as the larger feed-roll, so that their adjacent surfaces move in opposite directions, and the smaller or screw roll tends to lift the seed and wrench the lint therefrom with an endwise movement, as hereinafter explained.

Figures 1, 1A:
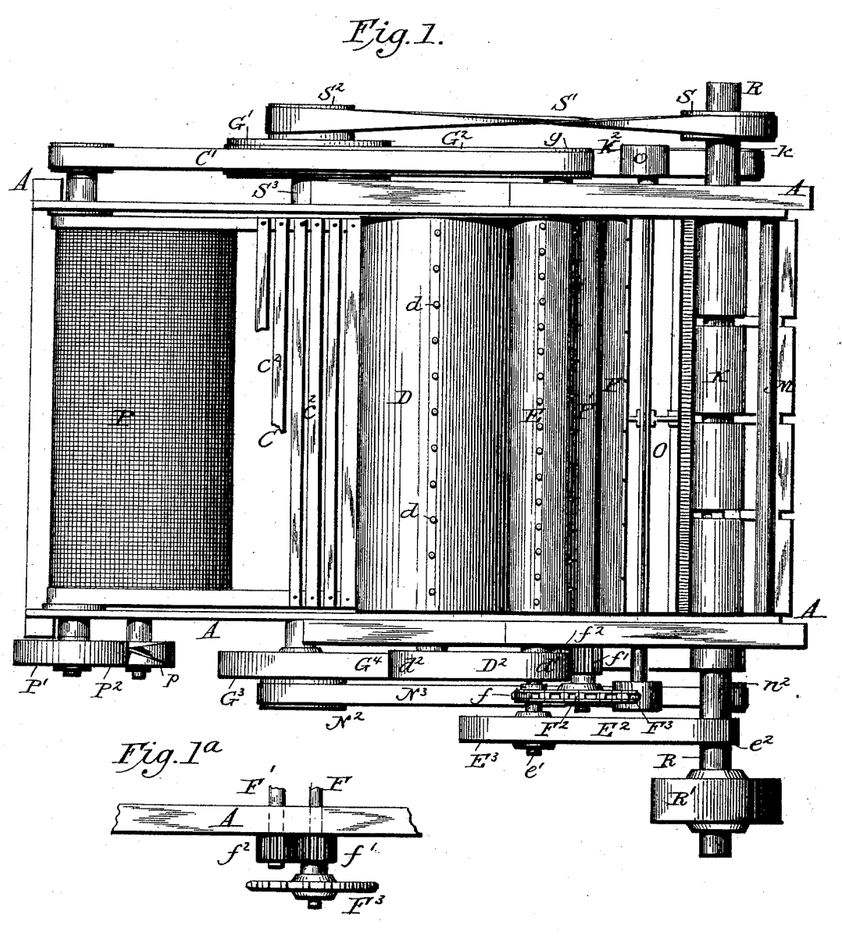
Figure 2:
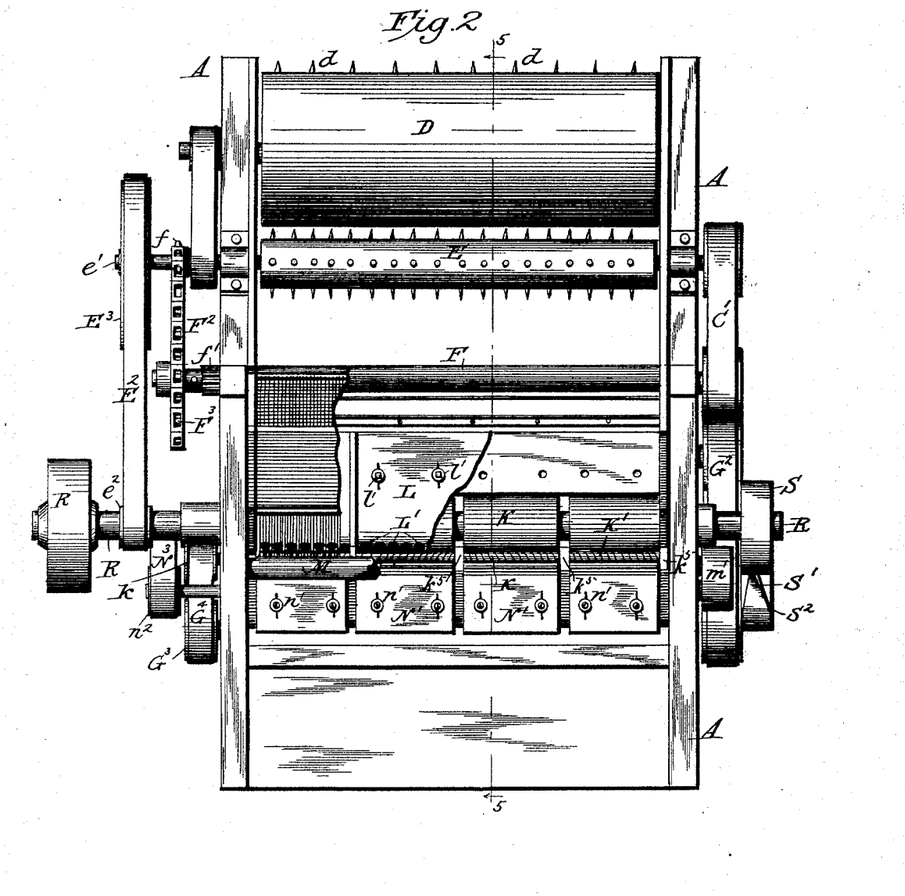
Fig. 2, a rear elevation with parts broken away to show portions behind them.
Figure 2A:
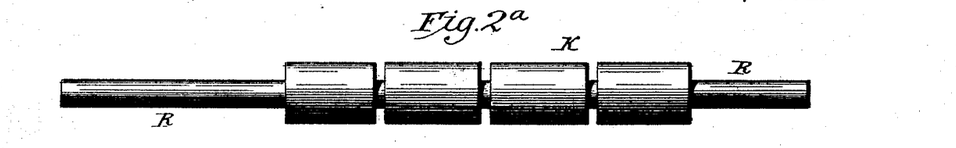
Figure 3:
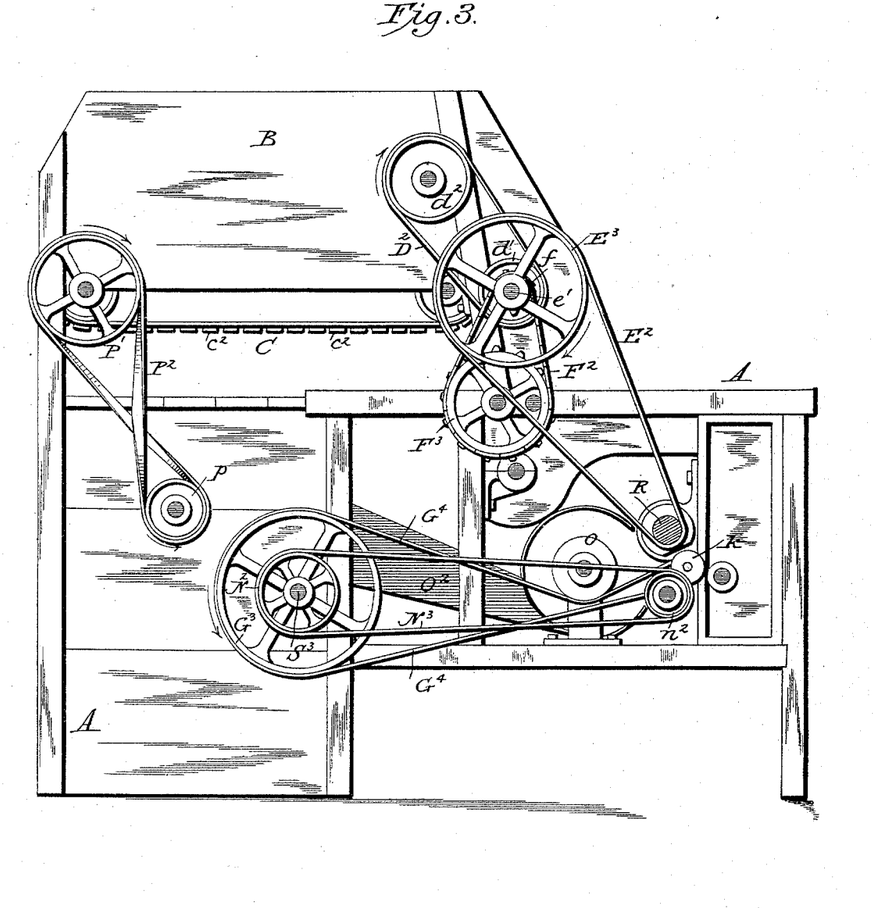
Fig. 3, an elevation of the right side of the machine with part of the driving-gear in section.
Figure 7:
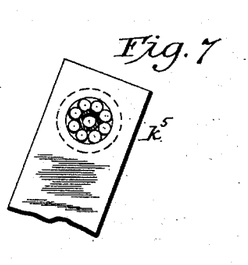
Figs. 7 and 7$^a$ are detail views of antifriction journal-bearings which may be employed.

The smaller ginning-roll is supported in bearings $k^5$ a short distance apart—say about eight inches—to prevent it from springing or yielding laterally. Figs. 2, 8, and 9 show the way in which this roller is constructed and supported. Figs. 7 and 7ª show friction journals or bearings of the ball or roller type in which the screw-roller revolves. The large roll is recessed at intervals to receive the bearings $k^5$, in which the journals or collars $k^6$ of the smaller ginning-roll turn to permit the two rolls to work in contact. This organization enables us to run this screw-roller at very high speed—say three thousand five hundred revolutions per minute—with a very small expenditure of power. The friction between the two ginning-rolls would ordinarily be sufficient for this purpose; but we prefer to drive it positively with a belt or gearing to prevent slipping or stopping.

The front wall of the chute J consists of a guard-plate or a series of plates L, the lower portion of which conforms to the contour of the large ginning-roll, close to and between which and the lower ginning-roll its lower edge lies. This guard-plate is rendered adjustable by well-known means, such as vertical slots and set-screws $l'$, which control its vertical movement, and by set-screws $l^2$, which regulate it laterally. The lower edge of the guard-plate is provided with a series of egg-shaped openings L′, arranged point downward, with slots $l$ extending through the edge of the guard-plate. (See Figs. 10 and 10ª.) These openings flare outward to receive the seed-cotton which rests in them against the face of the larger ginning-roll which draws the lint therefrom, but prevent the seed from passing through as it revolves close to the inner edge of the plate. The larger roll tends to draw the lint and seed down upon the screw-roll, which tends to lift the seed and wrench the lint therefrom and from the larger roller, as above explained, thus effectually delinting the seed.

Figures 5, 5A:
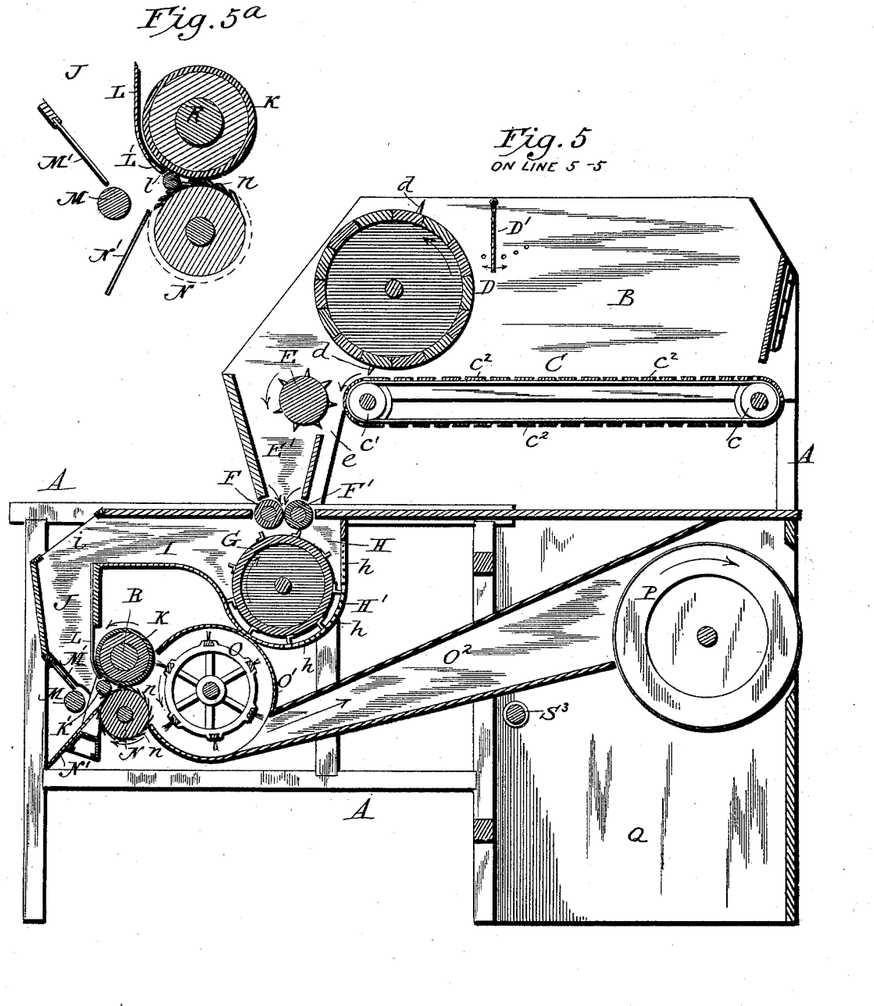
Figures 6, 7A:
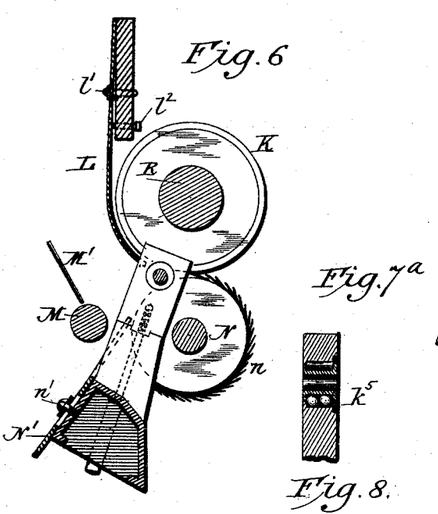

A carrying-roller M, turning in the bottom of the chute near the ginning-rolls, assists in feeding the seed-cotton to them, and an adjustable grating M′ above this roll regulates the width of the discharge-opening, through which grating a portion of the delinted seed passes into a suitable receptacle. The greater portion of the seed, however, passes down between the carrying-roll M and clearer-roll N over an inclined chute-board N′. The lint and seed escaping from the ginning-rolls are acted upon by a clearer-roll N, the surface of which is covered with longitudinal rows of parallel ribs or wings $n$, of elastic material—such as thin-rubber packing—which revolve in contact with both ginning-rolls and effectually remove any adhering lint therefrom. The front edges of the ribs are secured to the rolls, while their rear ends are free, overlapping each other like the feathers of a bird, Figs. 5 and 5ª.

A series of plates or inclined chute-boards N′, corresponding in length with the ginning-roll sections, are each provided with slots and clamp-screws $n'$ and lie tangentially to the surface of this clearer-roll and are adjustable endwise relatively thereto by sliding them on their supports, so as to allow more or less of the wings to act, as occasion requires. (See Figs. 2, 5, 5ª, and 6, from which it will be seen that the inner or upper edges of the plates cover more or less of the clearer-roll N, according to the distance of said edges from the smaller ginning-roll $k'$.) Fig. 5 shows the chute-board in its forward position close to the ginning-rolls, and Fig. 5ª shows the chute-board retracted.

A brush-wheel O, revolving rapidly close to the larger ginning-roll and clearer-roll, not only clears them from the lint, but creates an air-blast which drives the lint through the brush-wheel casing O′ and its hood O² and deposits it upon a perforated screen or drum P, revolving therein, over which it is carried and deposited outside the machine in a suitable receptacle. The air passing through this drum and escaping on its lower side drives the lint therefrom, and thus prevents the clogging of the drum or screen. Any dust left in the lint falls through the screen into a box Q.

We will now describe the driving mechanism. A driving-shaft R turns in suitable bearings near the lower rear portion of the machine, through which it extends transversely, both ends projecting beyond the main frame. It is driven from any suitable prime mover by a band or gear wheel R' on the right-hand side of the machine. The upper ginning-roll K is fixed on this shaft, the direction of rotation of which is shown by the arrow in Fig. 5. A belt $E^2$ encircles a small pulley $e^2$ on the driving-shaft and a large pulley $E^3$ on the shaft $e'$ of the lifting-roller E. A belt $D^2$ encircles a pulley $d'$ on the lifter-roller shaft $e'$ and a corresponding pulley $d^2$ on the shaft of the feed-cylinder D, thus driving it. The lifter-roller shaft $e'$ also carries a small sprocket-wheel $f$, encircled by a chain $F^2$, encircling a sprocket-wheel $F^3$ on the shaft of the forward rubber roll F', which drives the rear roller F by the spur-gears $f'$ $f^2$. The roller F' projects beyond the left side of the machine and carries a pulley encircled by a band C', which drives a corresponding pulley on the forward roll $c$ of the carrier-belt. This roller again extends through to the right-hand side of the machine and carries a band-wheel P', which by means of a cross-belt $P^2$ drives a small pulley $p$ on the shaft of the revolving screen or drum P. A band-wheel S on the left end of the driving-shaft R is encircled by a cross-belt S', driving a corresponding pulley $S^2$ on a counter-shaft $S^3$. A band-wheel G' on the counter-shaft $S^3$ carries a belt $G^2$, driving a pulley $g$ on the shaft of the beater-cylinder. The pulley G' on the counter-shaft is made wide enough to carry another belt $K^2$, encircling a pulley $k$ on the shaft of the small ginning-roll K', and thence passing under a pulley $o$ on the shaft of the brush-wheel O, which is thus driven by the same belt. This brush-wheel and the small ginning-roll are likewise driven by a corresponding pulley $G^3$ and belt $G^4$ on the opposite or right side of the machine, which insures a positive steady motion to both the small ginning-roll and the brush-wheel. A pulley $N^2$ on the right-hand end of the counter-shaft $S^3$ carries a belt $N^3$, driving a pulley $n^2$ on the shaft of the clearer-roll N, which shaft projects through to the left-hand side of the machine and carries a pulley $m$, which drives the roller M by a belt $m'$, encircling the pulley $m^2$ thereon.

The parts are of course so proportioned as to drive them at the requisite relative speed.

Having thus fully described our improved roller-gin, what we claim therein as new, and as of our own invention, is—

1. The combination, substantially as hereinbefore set forth, of a hopper, a carrier-belt traversing it, a feed-cylinder revolving thereover to lift a portion of the feed-cotton therefrom, an adjustable gate which regulates the quantity so lifted over the cylinder, a lifting-roller near the carrier, a discharge-opening between the carrier-belt and lifting-roller, a second hopper below the lifting-roller, feed-rolls in the bottom of this hopper beneath the lifting-roller, and a beater-cylinder below the feed-rolls.

2. The combination, substantially as hereinbefore set forth, of a carrier-belt, a feed-cylinder revolving thereover, a lifting-roll near the carrier, feed-rolls beneath the lifting-rolls, a beater-cylinder below the feed-rolls, ginning-rolls, a tunnel connecting these rolls and the beater cylinder, and screens at each end of the tunnel for the escape of foreign matters and to prevent the formation of eddy currents in the tunnel, as set forth.

3. The combination, substantially as hereinbefore set forth, of an elastic-surfaced ginning-roll of comparatively-large diameter, a spirally-grooved hard-surfaced ginning-roll of smaller diameter, running in contact therewith at a much higher velocity and in an opposite direction at its point of contact with the larger roll, a chute in front of the rolls, and a vertically-arranged guard-plate in the chute in front of the larger roll, curved, as described, to conform to the curvature of said roll and to cover that side of the roll next the chute and having one edge arranged between the two rolls and provided with a series of openings to allow the cotton-seed to come in contact with the surface of the larger roll without passing between it and the smaller roll.

4. The combination, substantially as hereinbefore set forth, of a ginning-roll with a guard-plate provided with ovoid-shaped perforations or slots flaring outward on the seed side to facilitate the entrance of the seed therein and the removal of the lint therefrom.

5. The combination, substantially as hereinbefore set forth, of an elastic-surfaced ginning-roll of comparatively-large diameter, a hard-surfaced spirally-grooved ginning-roll of smaller diameter running at high speed in contact with the larger roll, and a clearer-roll provided with parallel overlapping elastic ribs, arranged to revolve in contact with both the larger and smaller rolls and to clear the cotton therefrom.

6. The combination, substantially as hereinbefore set forth, of an elastic-surfaced ginning-roll, a perforated guard-plate, a clearer-roll in contact with the ginning-roll, and an interposed small spirally-grooved ginning-roll running in contact with both the other rolls.

7. The combination, substantially as hereinbefore set forth, of a clearer-roll, its elastic overlapping ribs or wings, a chute-board consisting of a series of plates tangential to the clearer-roll, and means for adjusting these plates endwise relatively to the clearer-roll to vary its active surface.

8. The combination, substantially as hereinbefore set forth, of a smooth-surfaced ginning-roll, an adjacent perforated guard-plate conforming to its curvature, a hard-surfaced spirally-grooved ginning-roll, a ribbed clearer-roll in contact with both these rolls, a chute-board consisting of a series of plates tangential to the clearer-roll, and means for adjusting these plates endwise relatively thereto to overlap more or less of the clearer-roll, to vary the active surface of the clearer-roll.

9. The combination, substantially as hereinbefore set forth, of an open-bottomed feed-chute, ginning-rolls adjacent thereto, a perforated guard-plate conforming in curvature to one of the ginning-rolls, a ribbed clearer-roll revolving in contact with the ginning-rolls, a grating on the opposite side of the chute, and a feed-roll beneath the grating.

10. The combination, substantially as hereinbefore set forth, of an open-bottomed feed-chute, ginning-rolls adjacent thereto, a perforated guard-plate conforming in curvature to one of the ginning-rolls, a ribbed clearer-roll revolving in contact with the ginning-rolls, a chute-board adjustable across the clearer-roll, a grating or gate on the opposite side of the chute, and a feed-roll beneath the grating.

11. The combination, substantially as hereinbefore set forth, of an elastic-surfaced ginning-roll of comparatively-large diameter, a hard-surfaced spirally-grooved ginning-roll of small diameter, and a ribbed clearer-roll (all revolving in contact) with a brush-wheel acting on the large ginning-roll and clearer-roll.

12. The combination, substantially as hereinbefore set forth, of ginning-rolls, a clearer-roll revolving close thereto, its elastic overlapping ribs or wings, a brush-wheel acting on one of the ginning-rolls and the clearer-roll, a hood, and a reticulated drum or screen rotating therein to carry over and discharge lint blown thereon by the brush-wheel.

13. The combination, substantially as hereinbefore set forth, of an open-bottomed hopper, feed-rolls revolving therein, a beater-cylinder beneath the feed-rolls, an open-bottomed chute connected with the beater-chamber, ginning-rolls adjacent thereto, a perforated guard-plate contiguous to the ginning-rolls, and a clearer-roll having elastic overlapping ribs or wings, acting upon the ginning-rolls.

14. The combination, substantially as hereinbefore set forth, of an open-bottomed hopper, feed-rolls revolving therein, a beater-cylinder beneath the feed-rolls, an open-bottomed chute connected with the beater-chamber, ginning-rolls adjacent thereto, a perforated guard-plate abutting against the ginning-rolls, a grating or gate on the opposite side of the chute, and a feed-roll beneath the grating.

15. The combination, substantially as hereinbefore set forth, of a hopper, feed-rolls therein, a beater-cylinder beneath them, a chute connected with the beater-chamber, ginning-rolls near the discharge end of the chute, a perforated guard-plate co-operating with the ginning-rolls, a clearer-roll in contact with the ginning-rolls, a chute-board adjustable across the discharge-opening and clearer-roll, a grating in the chute, and a feed-roll in the discharge-opening.

In testimony whereof we have hereunto subscribed our names.

JOHN RICHARD MONTAGUE.
JOHN ADAM PROSS.

Witnesses as to J. R. Montague:
W. D. BALDWIN,
LLOYD B. WIGHT.

Witnesses as to J. A. Pross:
C. E. LIPE,
A. A. SCHENCK.